(12) United States Patent
Matsuhashi et al.

(10) Patent No.: US 7,293,945 B2
(45) Date of Patent: Nov. 13, 2007

(54) NON-ROTARY CUTTING TOOL AND PROCESS OF MACHINING SCROLL MEMBER BY USING THE SAME

(75) Inventors: Hideaki Matsuhashi, Kyoto (JP); Tamotsu Nagai, Toyokawa (JP)

(73) Assignees: Matsushita Electric Industrial Co., Ltd, Osaka (JP); OSG Corporation, Aichi (JP)

( * ) Notice: Subject to any disclaimer, the term of this patent is extended or adjusted under 35 U.S.C. 154(b) by 0 days.

(21) Appl. No.: 11/304,034

(22) Filed: Dec. 15, 2005

(65) Prior Publication Data
US 2006/0133904 A1 Jun. 22, 2006

Related U.S. Application Data

(63) Continuation-in-part of application No. 10/771,812, filed on Feb. 4, 2004, now abandoned.

(30) Foreign Application Priority Data

May 8, 2003 (JP) .............................. 2003-129825
Sep. 4, 2003 (JP) .............................. 2003-312265

(51) Int. Cl.
*B23B 27/00* (2006.01)
(52) U.S. Cl. .................... 409/313; 408/145; 407/118; 407/119
(58) Field of Classification Search ............... 407/118, 407/119; 408/145; 409/313; *B23B 21/00*
See application file for complete search history.

(56) References Cited

U.S. PATENT DOCUMENTS 385,088 A * 6/1888 Benzie ........................ 408/227
846,756 A * 3/1907 Phillips ........................ 221/138
1,476,019 A * 12/1923 Lowry ........................... 407/54
1,781,863 A   11/1930 Shoemaker
1,965,950 A * 7/1934 Walker .......................... 172/713
3,857,305 A * 12/1974 Lichtman ....................... 76/115
4,956,318 A * 9/1990 Moskowitz et al. ........ 501/98.6
5,725,333 A * 3/1998 Abe et al. ...................... 407/54
5,853,268 A   12/1998 Simpson
6,030,156 A * 2/2000 Andronica ................... 408/144
6,206,619 B1 * 3/2001 Frisbie ......................... 408/144
6,431,800 B1 * 8/2002 Suzuki ......................... 407/119
2004/0221696 A1* 11/2004 Matsuhashi et al. ......... 82/1.11
2005/0166739 A1* 8/2005 Matsuhashi et al. .......... 83/649

FOREIGN PATENT DOCUMENTS

JP       11-336657     12/1999
WO       WO8908522 A1 * 9/1989

* cited by examiner

*Primary Examiner*—Monica Carter
*Assistant Examiner*—Sara Addisu
(74) *Attorney, Agent, or Firm*—Muramatsu & Associates

(57) ABSTRACT

A non-rotary cutting tool which is to be moved relative to a workpiece in a predetermined direction for cutting the workpiece, with its rake face being held substantially perpendicular to the predetermined direction. The cutting tool includes (a) a generally cylindrical shank portion, and (b) a generally semi-cylindrical body portion which has an outer circumferential surface constituted by the rake face and a semi-cylindrical surface. The semi-cylindrical body portion has a cutting edge which is defined by an edge of the rake face and which is covered with a diamond coating. Also disclosed is a process of machining a scroll member of a scroll compressor by using this non-rotary cutting tool.

8 Claims, 7 Drawing Sheets

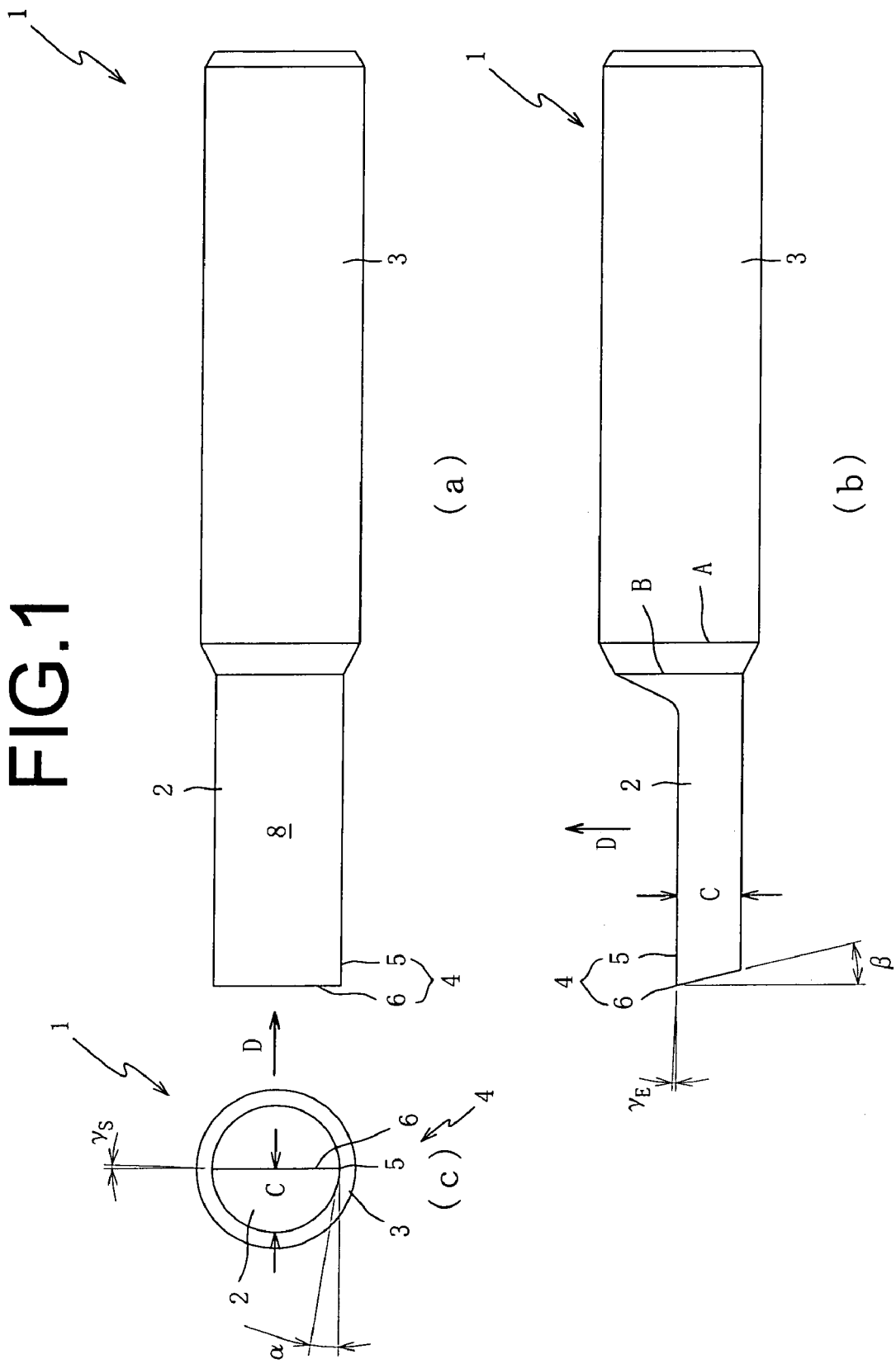

FIG. 2

| | NON-ROTARY CUTTING TOOL | END MILL |
|---|---|---|
| SHANK DIAMETER | 10 mm | 10 mm |
| WIDTH OF CUT | 8 mm | 8 mm |
| NUMBER OF TEETH | 1 | 6 |
| LENGTH OF CUT | 15 mm | 18 mm |
| BASE MATERIAL | K10 | K10 |
| COATING | DIAMOND COATING (GROUND AFTER ITS FORMATION) | DIAMOND COATING |
| SURFACE ROUGHNESS | 0.4 µm Rz | 2.0 µm Rz |
| NOSE RADIUS | 0.03 mm | 0.03 mm |
| PERPENDICULARITY | 0.9 µm | 2 µm |
| RADIUS ON CUTTING EDGE | 0.01 µm | 0.04 µm |
| CUTTING CONDITION — ROTATION SPEED | NOT ROTATED | 2000 r.p.m. |
| CUTTING CONDITION — FEED RATE | 6000 mm/min | 6000 mm/min |
| CUTTING CONDITION — DEPTH OF CUT | 0.01 mm | 0.01 mm |
| CUTTING CONDITION — WORK MATERIAL | ADC12 | |
| CUTTING CONDITION — USED MACHINE | HORIZONTAL-TYPE MACHINING CENTER | |
| CUTTING CONDITION — TOOL HOLDER | COLLET MILLING CHUCK | |
| CUTTING CONDITION — CUTTING FLUID | WATER SOLUBLE FLUID | |

FIG. 3

|  | NON-ROTARY CUTTING TOOL | END MILL |
|---|---|---|
| ROUGHNESS OF MACHINED SURFACE | 0.4 μm Rz | 2.0 μm Rz |
| RADIUS OF CURVATURE | 0.03 mm | 0.05 mm |
| PERPENDICULARITY | 0.9 μm | 4.9 μm |

NON-ROTARY CUTTING TOOL AND PROCESS OF MACHINING SCROLL MEMBER BY USING THE SAME

This is a continuation-in-part of U.S. patent application Ser. No. 10/771,812 filed Feb. 4, 2004 now abandoned.

BACKGROUND OF THE INVENTION

1. Field of the Invention

The present invention relates in general to a non-rotary cutting tool, and more particularly to such a non-rotary cutting tool that can be easily manufactured and used in a finishing step of a machining process.

2. Discussion of the Related Art

There is known a scroll compressor as one type of compressor which is used in a refrigeration or air conditioning system, for compressing a gas used as a refrigerant in the system. The scroll compressor is constructed to include a pair of scroll members which are arranged in an opposing manner with the scroll members being interfitted. The scroll members are given a relative orbiting motion with respect to each other, so that each of successive series of enclosed spaces defined by the scroll members progressively decreases in volume as it moves inwardly from a radially outer position to a central position. With the decrease in the volume of the enclosed space, a fluid such as a gas introduced into the enclosed space is compressed and is then discharged from the enclosed space.

FIG. 5A is a perspective view of a fixed scroll member 100 which is to be fixed to a housing (not shown) of the scroll compressor, while FIG. 5B is a perspective view of an orbiting scroll member 103 which is to be brought into meshing engagement with the fixed scroll member 100. The fixed scroll member 100 includes a base plate 101 and an involute or scroll wall 102 extending from the base plate 101 in a direction substantially perpendicular to the base plate 101. Similarly, the orbiting scroll member 103 includes a base plate 104 and an involute or scroll wall 105 extending from the base plate 104 in a direction substantially perpendicular to the base plate 104.

In an operation of the scroll compressor, the orbiting scroll member 103 held in engagement with the fixed scroll member 100 is rotated relative to the fixed scroll member 100, as shown in FIG. 6, whereby the gas within each of the enclosed spaces is compressed and is then discharged from the enclosed space through a discharge port 106 formed through the central position of the base plate 101 of the fixed scroll member 100. In this instance, the compression efficiency is increased with an increase in degree of fluid tightness between the scroll walls 103, 105.

Therefore, in a process of machining the scroll members 100, 103, it is necessary that the scroll walls 103, 105 be machined with a high degree of accuracy. In a conventional process of machining a scroll wall of a scroll member, as disclosed in JP-A-H11-336657 (publication of unexamined Japanese Patent Application laid open in 1999), its roughing, semi-finishing and finishing steps are carried out by using rotary cutting tools such as end mills.

In the conventional machining process, however, each end mill attached to a spindle of a machine tool through a holder tends to suffer from its "run out" while being rotated with the spindle. In a finishing step of a machining process, the run out of the end mill makes it impossible to obtain a sufficiently high degree of machining accuracy, which is required in machining of scroll walls of a scroll compressor, for assuring a sufficiently high degree of fluid tightness between the scroll walls and a sufficiently high degree of compression efficiency in the scroll compressor. The degree of fluid tightness is inevitably reduced with reduction in the accuracy of the machining of the scroll walls, thereby problematically making it difficult to obtain the sufficiently high degree of compression efficiency in the scroll compressor. Further, it is also difficult to obtain an end mill inherently suitable for finishing the scroll walls which require to be finished with a considerably high machining accuracy.

SUMMARY OF THE INVENTION

The present invention was made in view of the background prior art discussed above. It is therefore a first object of the present invention to provide a non-rotary cutting tool which is easily manufactured and is capable of exhibiting a high degree of machining accuracy required in a finishing step of a machining process. This first object may be achieved according to any one of first through eighth aspects of the invention which are described below.

It is a second object of the invention to provide a process of advantageously machining a scroll member of a scroll compressor, by using the non-rotary cutting tool. This second object may be achieved according to either of ninth and tenth aspects of the invention which are described below.

The first aspect of this invention provides a non-rotary cutting tool which is to be moved relative to a workpiece in a predetermined direction for cutting the workpiece, with a rake face thereof being held substantially perpendicular to the predetermined direction, the cutting tool comprising: (a) a generally cylindrical shank portion; and (b) a generally semi-cylindrical body portion which is coaxial with the cylindrical shank portion and which has an outer circumferential surface constituted by the rake face and a semi-cylindrical surface, wherein the semi-cylindrical body portion has a cutting edge which is provided by an edge of the rake face and which includes a covered portion covered with a diamond coating.

According to the second aspect of the invention, in the non-rotary cutting tool defined in the first aspect of the invention, the cutting edge includes a side cutting edge portion and an end cutting edge portion which are contiguous to each other, wherein the side cutting edge portion is defined by an intersection of the rake face and the semi-cylindrical surface, while the end cutting edge portion is defined by an intersection of the rake face and an axially distal end face of the semi-cylindrical body portion, and wherein at least one of the side cutting edge portion and the end cutting edge portion of the cutting edge is covered by the diamond coating.

According to the third aspect of the invention, in the non-rotary cutting tool defined in the second aspect of the invention, the side cutting edge portion and the end cutting edge portion of the cutting edge intersect with each other at a corner which is so sharp that the corner has a nose radius of not larger than 0.05 mm.

According to the fourth aspect of the invention, in the non-rotary cutting tool defined in any one of the first through third aspects of the invention, the diamond coating has a surface abraded or smoothed to have a surface roughness Rz of not larger than 1.60 μm.

According to the fifth aspect of the invention, in the non-rotary cutting tool defined in any one of the first through fourth aspects of the invention, at least one of the side cutting edge portion and the end cutting edge portion of the cutting edge is so sharp that a radius on each of the above-described at least one of the cutting edge portion and the end cutting edge portion is not larger than 0.03 mm.

According to the sixth aspect of the invention, in the non-rotary cutting tool defined in the second or third aspect of the invention, the side cutting edge portion of the cutting edge has a high degree of parallelism with respect to an axis of the cylindrical shank portion such that an error in the parallelism is not larger than 3 µm, wherein the end cutting edge portion of the cutting edge has a high degree of perpendicularity with respect to the axis of the cylindrical shank portion such that an error in the perpendicularity is not larger than 3 µm.

According to the seventh aspect of the invention, in the non-rotary cutting tool defined in any one of the first through sixth aspects of the invention, wherein the cylindrical shank portion and the semi-cylindrical body portion are provided by a single piece.

According to the eighth aspect of the invention, in the non-rotary cutting tool defined in any one of the first through seventh aspects of the invention, the rake face is provided by a flat surface which is elongated in an axial direction of the semi-cylindrical body portion and which has a width smaller than a diameter of the cylindrical shank portion.

The ninth aspect of this invention provides a process of machining a scroll member of a scroll compressor which has a base plate and a scroll wall extending from the base plate in a direction substantially perpendicular to the base plate, by using a non-rotary cutting tool comprising (a) a generally cylindrical shank portion, and (b) a generally semi-cylindrical body portion which is coaxial with the cylindrical shank portion and which has an outer circumferential surface constituted by a rake face and a semi-cylindrical surface, wherein the semi-cylindrical body portion has a cutting edge which is defined by an edge of the rake face and which is covered with a diamond coating, the process comprising a step of moving at least one of the non-rotary cutting tool and the scroll member relative to the other in such a direction that permits the scroll wall and the base plate to be machined by the cutting edge, while holding the rake face substantially perpendicular to the direction.

According to the tenth aspect of the invention, in the method defined in the ninth aspect of the invention, the cutting edge includes a side cutting edge portion and an end cutting edge portion which are contiguous to each other, wherein the scroll wall and the base plate are machined by the side cutting edge portion and the end cutting edge portion of the cutting edge, respectively.

The non-rotary cutting tool defined in any one of the first through eighth aspects of the invention is advantageously used for machining a slot or groove in a workpiece. In the machining operation, at least one of the cutting tool and the scroll member is moved relative to the other or each other in a predetermined direction, while the rake face of the cutting tool is held substantially perpendicular to the predetermined direction. Since the cutting tool is not rotated in the machining operation, the machined workpiece is free from deterioration in its accuracy which could be caused by "run out" of the cutting tool. Where this non-rotary cutting tool is used for machining a pair of scroll members of a scroll compressor, as in the ninth aspect of the invention, the pair of scroll members can be machined with a higher degree of accuracy than where it is machined by a rotary cutting tool such as an end mill which is likely to suffer from its run out, so that it is possible to obtain a higher degree of fluid tightness between scroll walls of the respective scroll members and accordingly a higher degree of compression efficiency in the scroll compressor.

In the process of machining each scroll member of the scroll compressor, the machining process can be completed by implementations of only two steps, i.e., a roughing step and a finishing step which may be carried out with an end mill and the present non-rotary cutting tool, respectively. This is advantageous over the conventional process of machining the scroll member with end mills, which requires implementation of three steps, i.e., a roughing step, a semi-finishing step and a finishing step. That is, the machining process with use of the present non-rotary cutting tool eliminates necessity of the implementation of the semi-finishing step, thereby advantageously leading to an increased efficiency of manufacturing of the scroll compressor with a reduced cost.

Further, the present non-rotary cutting tool capable of finishing the scroll member of the scroll compressor with a high degree of machining accuracy is easier to manufacture, than an end mill which is to be used in the finishing step of the conventional process of machining the scroll member.

Further, owing to the diamond coating covering the entirety or part of the cutting edge, the cutting edge is prevented from being undesirably deflected in the machining operation.

In the non-rotary cutting tool defined in the third aspect of the invention, the corner at which the side cutting edge portion and the end cutting edge portion intersect with each other is so sharp that the nose radius of the corner is 0.05 mm or less. Where this non-rotary cutting tool is used for machining a pair of scroll members of a scroll compressor, such a small nose radius of the corner permits a corner between the scroll wall and the base plate of each scroll member (which are respectively machined by the side cutting edge portion and the end cutting edge portion of the cutting edge) to have a small radius of curvature. The small radius of curvature of the corner between the scroll wall and the base plate leads to a high degree of fluid tightness between the scroll walls of the pair of scroll members, when they are held in engagement with each other, so that the compression efficiency of the scroll compressor is increased.

In the non-rotary cutting tool defined in the fourth aspect of the invention, the diamond coating has a surface abraded or smoothed to have the surface roughness with maximum height Rz of not larger than 1.60 µm. Such a high degree of smoothness of the surface of the diamond coating is effective to provide the workpiece with a high degree of surface smoothness in the finishing step of the machining process.

In the non-rotary cutting tool defined in the fifth aspect of the invention, a chamfer or radius on at least one of the side cutting edge portion and the end cutting edge portion of the cutting edge is not larger than 0.03 mm. Such a sharp cutting edge facilitates machining of the workpiece with a sufficiently high degree of accuracy in the finishing step of the machining process.

In the non-rotary cutting tool defined in the sixth aspect of the invention, the side cutting edge portion of the cutting edge has the high degree of parallelism with respect to the axis of the cylindrical shank portion such that the error in the parallelism is not larger than 3 µm, while the end cutting edge portion of the cutting edge has the high degree of perpendicularity with respect to the axis of the cylindrical shank portion such that the error in the perpendicularity is not larger than 3 µm. In other words, the side cutting edge portion is not deviated, by an amount larger than 3 µm, from a geometrical straight line which is precisely parallel with the axis of the cylindrical shank portion, while the end cutting edge portion is not deviated, by an amount larger than 3 µm, from a geometrical straight line which is precisely perpendicular to the axis of the cylindrical shank portion. Such a minimum error in the contour of the cutting tool is advantageous, especially, where the cutting tool is used for finishing a workpiece, such as the scroll member of the scroll compressor, which requires to be finished with a high degree of machining accuracy.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which:

FIG. 1 is a set of three views of a non-rotary cutting tool which is constructed according to a first embodiment of the invention, wherein a front view, a side view and a bottom view of the cutting tool are given at (c), (b) and (a), respectively;

FIG. 2 is a table indicating specifications of the non-rotary cutting tool and an end mill used in a cutting test, and cutting conditions in the cutting test;

FIG. 3 is a table indicating a result of the cutting test;

DETAILED DESCRIPTION OF THE PREFERRED EMBODIMENT

Figure 7:
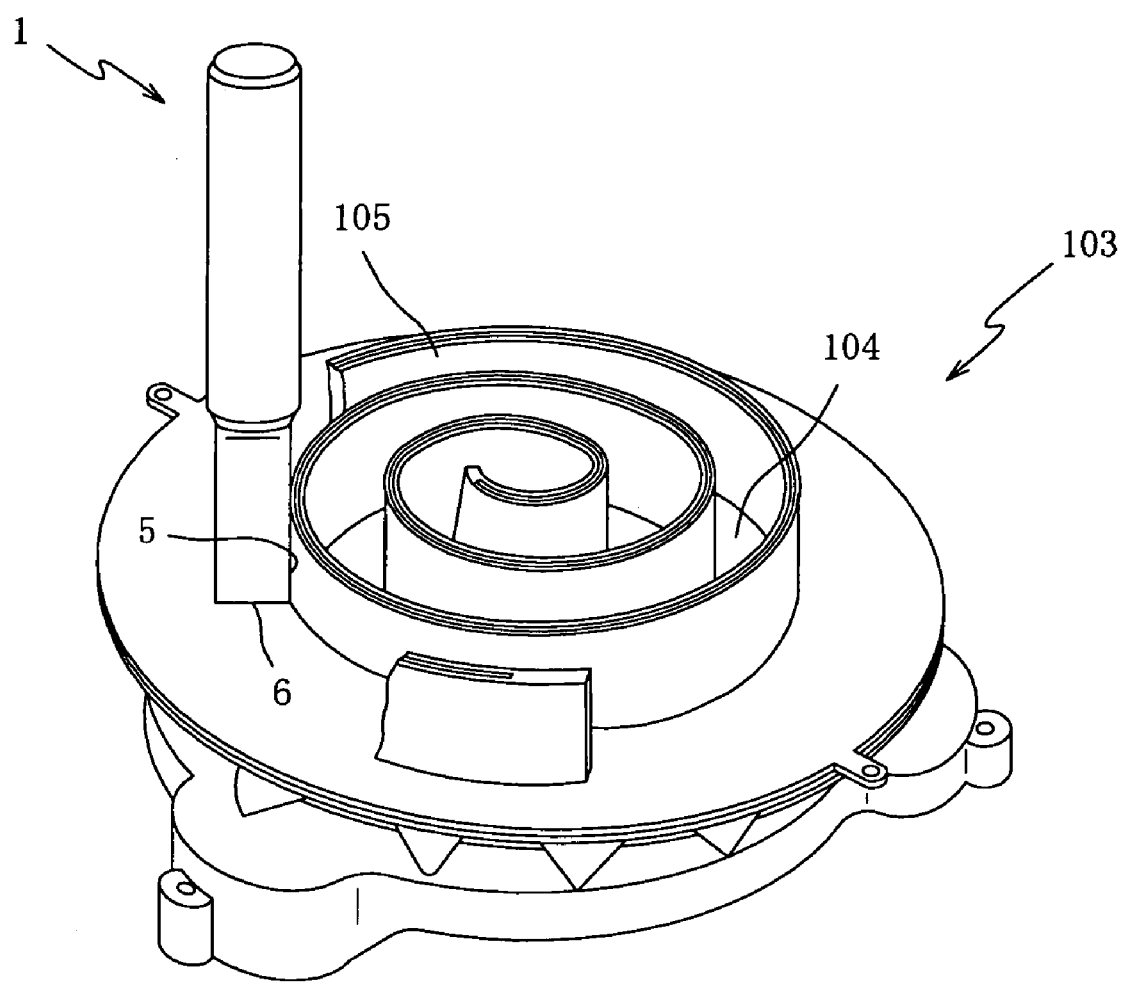
FIG. 7 is a view illustrating a machining operation in which the scroll member of the scroll compressor is machined by the non-rotary cutting tool of the invention.

Referring first to FIG. 1, there will be described a non-rotary cutting tool 1 which is constructed according to a first embodiment of the invention. FIG. 1 is a set of three views of the non-rotary cutting tool 1, wherein its front view, side view and bottom view are given at (c), (b) and (a), respectively. The non-rotary cutting tool 1 is a so-called "gooseneck tool", and is to be held at its end portion (right end portion as seen at (a), (b) of FIG. 1) by a suitable tool holder (not shown) so that the cutting tool 1 is fixed to a spindle of a machine tool (not shown) such as a machining center through the suitable tool holder. This non-rotary cutting tool 1 is advantageously used, for example, in a finishing step of a process of machining a scroll compressor, as shown in FIG. 7.

The non-rotary cutting tool 1 is provided by a substrate (single piece) formed of a cemented carbide which is made from, for example, tungsten carbide (WC) in a powder-metallurgy process including compacting and sintering steps. The cutting tool 1 includes a generally semi-cylindrical body portion 2 which has a generally semi-circular cross sectional shape (as shown at (c) of FIG. 1), and a generally cylindrical shank portion 3 which is coaxially contiguous to a proximal end portion of the semi-cylindrical body portion 2 (i.e., right end portion of the body portion 2 as seen at (a), (b) of FIG. 1). Preferably, the generally semi-cylindrical body portion 2 has a half-moon shape in cross section as shown in (c) of FIG. 1. The cutting tool 1 is held at the shank portion 3 by the tool holder, so that the cutting tool 1 is attached to a machine tool through the tool holder.

The semi-cylindrical body portion 2, serving as a cutting blade portion, has a rake face 8 consisting of a flat surface which lies substantially on an axis of the cylindrical shank portion 3, and a cutting edge 4 which is defined by an edge of the rake face 8. The semi-cylindrical body portion 2 has an outer circumferential surface constituted by the rake face 8 and a semi-cylindrical surface. The rake face 8, provided by the flat surface, is elongated in an axial direction of the semi-cylindrical body portion 2, and has a width smaller than a diameter A of the cylindrical shank portion 3.

Further, a thickness C of the rake face 8 is a half of a diameter B of the tapered end of the cylindrical shank portion 3 since the semi-cylindrical body portion 2 has the half-moon shape in cross section as shown in FIGS. 1(b) and 1(c). Namely, within the context of the present invention, the half-moon does not include a pale semicircle or a crescent shape having a thickness substantially smaller than a diameter. In other words, the half-moon is different from a thin cutting edge suitable for cutting a workpiece of soft material.

In the present invention, as noted above, the semi-cylindrical body portion (cutting edge) has the half-moon shape in cross section. Because the cutting tool of the present invention is used in the machining process for cutting the hard material to form the scroll members 100, 103, very high rigidity and durability is required for the cutting edge. Such high rigidity and durability is achieved by the half-moon cross sectional shape of the semi-cylindrical body portion because the half-moon shape has a sufficient thickness which is a half of the diameter of the tapered end of the cylindrical shank portion.

The cutting edge 4 includes a side cutting edge portion 5 located at each of widthwise opposite ends of the rake face 8, and an end cutting edge portion 6 located at an axially distal end of the rake face 8. In other words, the side cutting edge portion 5 is provided by an intersection of the rake face 8 and the semi-cylindrical surface, while the end cutting edge portion 6 is provided by an intersection of the rake face 8 and an axially distal end face of the semi-cylindrical body portion 2. The side cutting edge portion 5 and the end cutting edge portion 6 intersect substantially perpendicularly with each other, as shown at (a) of FIG. 1. A nose or corner at which the side and end cutting edge portions 5, 6 intersect with each other is so sharp to have a nose radius of not larger than 0.05 mm.

The semi-cylindrical body portion 2 is coated at its surface with a diamond coating in accordance with CVD method, so that the cutting edge 4 including the side and end cutting edge portions 5, 6 is covered with the diamond coating. In the present embodiment, the diamond coating has a thickness of about 6–20 μm. The diamond coating is likely to easily peel off the body portion 2 if its thickness is smaller than 6 μm. The thickness of larger than 20 μm is not appropriate from an economical point of view.

The diamond coating is ground by a grindstone such that the surface of the diamond coating is smoothed to have a roughness with maximum height Rz of not larger than 1.60 μm. It is noted that the diamond coating may be otherwise smoothed, for example, by means of laser, ion-beam, thermochemical-mechanical polishing or mechanical-chemical polishing.

A portion of the semi-cylindrical surface immediately below the side cutting edge portion 5 is ground so as to serve as a side flank face, such that a side-relief angle α between this side flank face and a line drawn through the side cutting edge portion 5 perpendicularly to the rake face 8 is 5°, as shown at (c) of FIG. 1. The side cutting edge portion 5 is so sharp that a chamfer or radius on the side cutting edge portion 5 is not larger than 0.03 mm. Further, the side cutting edge portion 5 is not deviated, by an amount larger than 3 μm, from a geometrical straight line which is precisely parallel with the axis of the cylindrical shank portion 3. In other words, the side cutting edge portion 5 has a high degree of parallelism with respect to the axis of the cylindrical shank portion 3 such that an error in the parallelism is not larger than 3 μm.

An end-relief angle β between an end flank face (provided by the axially distal end face of the semi-cylindrical body portion 2) and a line drawn through the end cutting edge portion 6 perpendicularly to the rake face 8 is 5°, as shown at (b) of FIG. 1. The end cutting edge portion 6 is so sharp that a chamfer or radius on the end cutting edge portion 6 is not larger than 0.03 mm. Further, the end cutting edge portion 6 is not deviated, by an amount larger than 3 μm, from a geometrical straight line which is precisely perpendicular to the axis of the cylindrical shank portion 3. In other words, the end cutting edge portion 6 has a high degree of perpendicularity with respect to the axis of the cylindrical shank portion 3 such that an error in the perpendicularity is not larger than 3 μm.

In a machining operation with the non-rotary cutting tool 1 constructed as described above, the cutting tool 1 is moved relative to a workpiece in a predetermined direction, while being kept unrotated and maintaining such a posture that permits the rake face 8 to be held substantially perpendicular to the predetermined direction, so that the workpiece is cut by the side and end cutting edge portions 5, 6 of the cutting edge 4. While the cutting tool 1 is relative moved by the movement of the workpiece, the outer shapes of the side cutting edge portion 5 and the end cutting edge portion 6 are transferred to the surface of the workpiece. Accordingly, the side wall and the base of the workpiece are machined by the side cutting edge portion 5 and the end cutting edge portion 6, respectively.

In other words, since the rake face 8 is perpendicular to the relative moving direction, a rake angle of the rake face 8 of the cutting tool 1 is 0°. Here, the rake angle is an angle between a plane (tool reference plane) perpendicular to the moving direction and a rake face. In the present invention, as shown in FIGS. 1(b) and 1(c), a rake angle $\gamma_E$ of the end cutting edge portion 6 and a rake angle $\gamma_S$ of the side cutting edge portion 5 are respectively 0° throughout the operation. Since the cutting tool 1 is not rotated in the machining operation, and the rake angle during the machining operation is 0°, the machined workpiece (scroll member) has a higher degree of accuracy than where it is machined by a conventional rotary cutting tool such as an end mill which is likely to suffer from its run out. Thus, it is possible to obtain a higher degree of fluid tightness between scroll walls of the respective scroll members.

FIG. 7 is a view illustrating a machining operation in which the scroll member of the scroll compressor is machined by the non-rotary cutting tool 1. In this machining operation performed in a machining center equipped with a rotary table that is rotatable about A axis, the scroll member mounted on the rotary table is controlled to be moved relative to the cutting tool 1 (attached to a spindle of the machining center) in at least one of X-axis and Y-axis directions at a predetermined feed rate, while being rotated about A axis at a predetermined angular velocity, so that the scroll wall 105 and the base plate 104 are machined by the side cutting edge portion 5 and the end cutting edge portion 6 of the cutting edge 4, respectively.

Figure 5A:
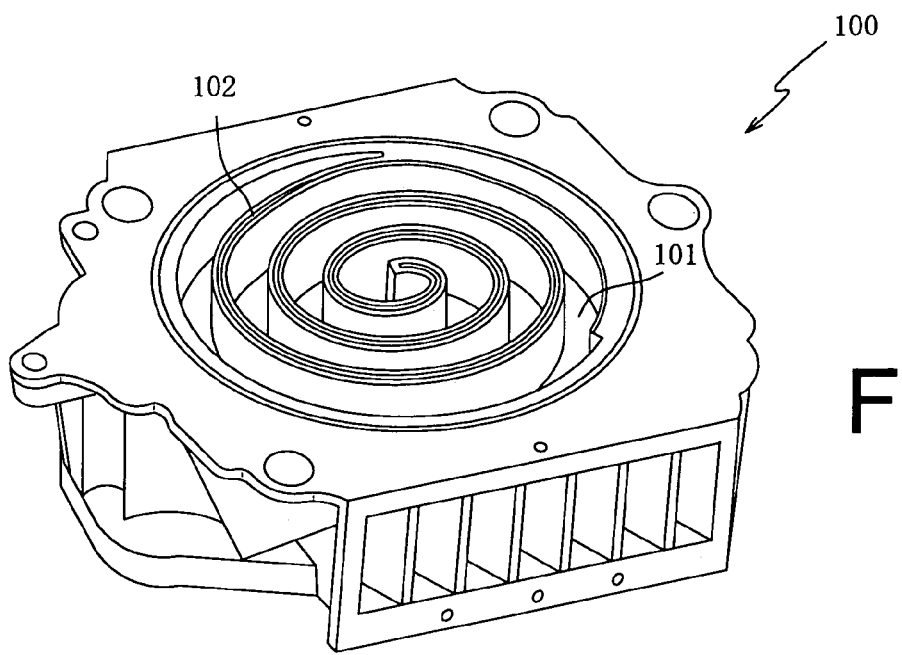
FIG. 5A is a perspective view of a fixed scroll member as a product machined by the non-rotary cutting tool of the invention.
Figure 5B:
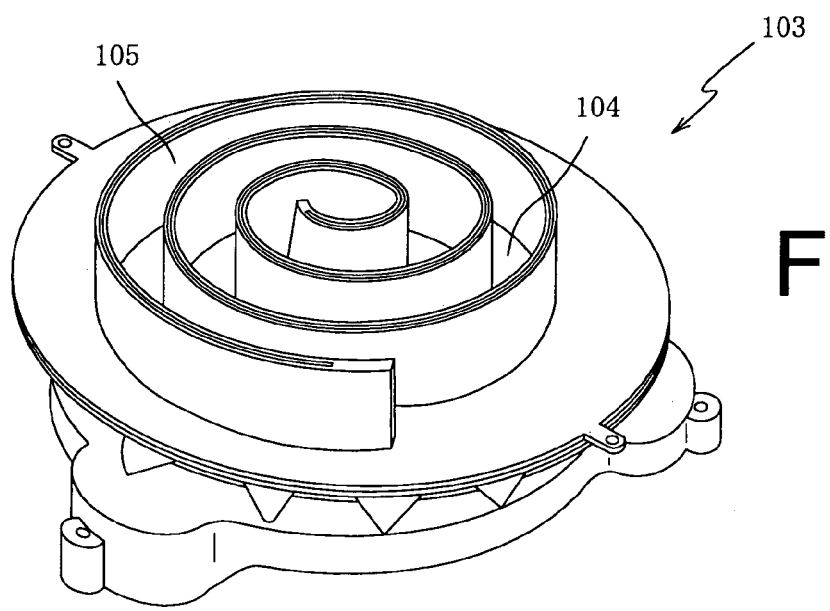
FIG. 5B is a perspective view of an orbiting scroll member as a product machined by the non-rotary cutting tool of the invention.
Figure 6:
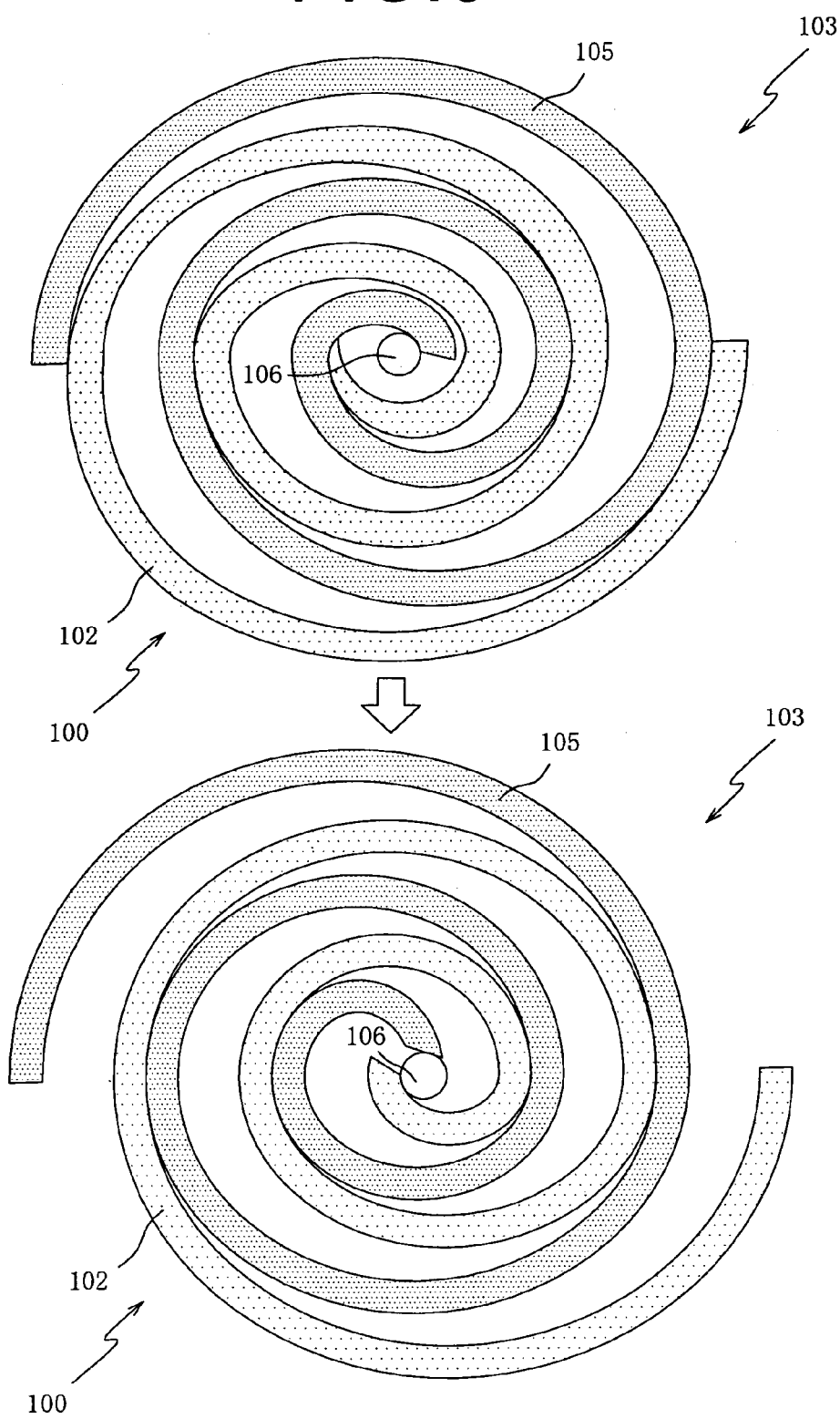
FIG. 6 is a set of views showing an operation of a scroll compressor which is constituted by the fixed scroll member and the orbiting scroll member.

Referring next to tables of FIGS. 2 and 3, there will be described a result of a test which was conducted for verifying technical advantages of the non-rotary cutting tool 1 constructed as described above. In this test, a workpiece in the form of the scroll member of the scroll compressor as shown in FIGS. 5A and 5B is machined by the cutting tool 1 and also by an end mill, for comparing machining accuracy provided by the cutting tool 1 with that provided by the end mill.

The table of FIG. 2 indicates specifications of the cutting tool 1 and the end mill, and cutting conditions in the test. The "SURFACE ROUGHNESS" in the cutting tool 1 means a surface roughness at the side and end cutting edge portions 5, 6 of the cutting edge 4, while that in the end mill means a surface roughness at its peripheral and end cutting edges. The "NOSE RADIUS" in the cutting tool 1 means a nose radius of the corner at which the side and end cutting edge portions 5, 6 intersect with each other, while that in the end mill means a nose radius of a corner at which the peripheral and end cutting edges intersect with each other. The "PERPENDICULARITY" in the cutting tool 1 means an error in perpendicularity of the end cutting edge portion 6 with respect to the axis of the cylindrical shank portion 3, while that in the end mill means an error in perpendicularity of the end cutting edge with respect to the axis of its cylindrical shank portion. The "RADIUS ON CUTTING EDGE" in the cutting tool 1 means a chamfer or radius on each of the side and end cutting edge portions 5, 6, while that in the end mill means a chamfer or radius on each of the peripheral and end cutting edges.

The table of FIG. 3 indicates the result of the cutting test. The "ROUGHNESS OF MACHINED SURFACE" means a roughness of the surface machined by each of the cutting tool 1 and the end mill. The "RADIUS OF CURVATURE" means a radius of the curvature on a corner between the scroll wall and the base plate in the scroll member machined by each of the cutting tool 1 and the end mill. The "PERPENDICULARITY" means a perpendicularity of the scroll wall with respect to the base plate in the scroll member machined by each of the cutting tool 1 and the end mill.

As apparent from the table of FIG. 3, the non-rotary cutting tool 1 of the invention exhibited a better performance, than the end mill, in all of the smoothness of the machined surface, the sharpness on the corner between the scroll wall and the base plate, and the perpendicularity of the scroll wall with respect to the base plate. In the machining with the non-rotary cutting tool 1, the accuracy of contour of the cutting edge 4 was precisely reflected in the accuracy of the machined workpiece.

On the other hand, in the machining with the end mill, the accuracy of contour of the end mill was not precisely reflected in the accuracy of the machined workpiece. Described specifically, the radius of the curvature on the corner in the scroll member was 0.05 mm which was larger than the nose radius in the end mill (=0.03 mm). The perpendicularity in the scroll member was 4.9 μm which was larger than the perpendicularity in the end mill (=2 μm). It is considered that the deterioration in the accuracy of the workpiece machined by the end mill was due to undesirable run-out and deflection of the end mill during the machining operation.

As described above, in the non-rotary cutting tool 1, owing to the hard diamond coating, the cutting edge portions 5, 6 covered by the diamond coating are given a high degree of rigidity so as to be prevented from being deflected in the machining operation. Further, the surface of the diamond coating is ground to have a high degree of surface smoothness that is effective to provide the workpiece with a high degree of surface smoothness in the finishing step of the machining process.

Where the non-rotary cutting tool 1 is used for machining each of the scroll members 100, 103 of the scroll compressor, at least one of the cutting tool 1 and the scroll member is moved relative to the other or each other in a predetermined direction, while the rake face 8 of the cutting tool 1 is held substantially perpendicular to the predetermined direction, so that the scroll wall and the base plate are machined by the side and end cutting edge portions 5, 6, respectively. As noted above, since the rake face 8 is perpendicular to the relative moving direction, the rake angle of the rake face 8 is 0° when cutting the scroll members 100, 103.

Since the cutting tool 1 is not rotated in the machining operation, the machined scroll member is free from deterioration in its accuracy which could be caused by "run out" of the cutting tool of the conventional type such as an end mill. That is, the pair of scroll members 100, 103 can be machined with a higher degree of accuracy than where it is machined by a rotary cutting tool such as an end mill which is likely to suffer from its run out, so that it is possible to obtain a higher degree of fluid tightness between scroll walls 102, 105 of the respective scroll members 100, 103 and accordingly a higher degree of compression efficiency in the scroll compressor.

Since the non-rotary cutting tool 1 is capable of machining each scroll member with a high machining accuracy, a finishing step of the process of machining each scroll member can be carried out by this cutting tool 1. It is noted that a roughing step of the machining process may be carried out by a conventional end mill.

Further, the present non-rotary cutting tool 1 capable of finishing the scroll member of the scroll compressor with a high degree of machining accuracy is easier to manufacture, than an end mill which is to be used in the finishing step of the conventional process of machining the scroll member.

Further, in the non-rotary cutting tool 1, the corner at which the side and end cutting edge portions 5, 6 intersect with each other is so sharp that the nose radius of the corner is 0.05 mm or less. Where the non-rotary cutting tool 1 is used for finishing the pair of scroll members 100, 103 of the scroll compressor, since the corner between the scroll wall and the base plate is given substantially the same shape as the sharp corner between the side and end cutting edge portions 5, 6, it is possible to obtain a high degree of fluid tightness between the scroll walls 102, 105 of the pair of scroll members 100, 103, when they are held in engagement with each other, so that the compression efficiency of the scroll compressor is increased.

Further, in the non-rotary cutting tool 1, the diamond coating has a surface ground or smoothed to have the surface roughness with maximum height Rz of not larger than 1.60 µm. Such a high degree of smoothness of the surface of the diamond coating is effective to provide the workpiece with a high degree of surface smoothness in the finishing step of the machining process.

Further, in the non-rotary cutting tool 1, the chamfer or radius on each of the side cutting edge portion 5 and the end cutting edge portion 6 of the cutting edge 4 is not larger than 0.03 mm. Such a sharp cutting edge facilitates machining of the workpiece with a sufficiently high degree of accuracy in the finishing step of the machining process.

Further, in the non-rotary cutting tool 1, the error in the parallelism of the side cutting edge portion 5 with respect to the axis of the cylindrical shank portion 3 is not larger than 3 µm, while the error in the perpendicularity of the end cutting edge portion 6 with respect to the axis of the cylindrical shank portion 3 is not larger than 3 µm. Such a minimum error in the contour of the cutting tool 1 is advantageous, especially, where the cutting tool 1 is used for finishing a workpiece, such as the scroll member of the scroll compressor, which requires to be finished with a dimensional error within a considerably small amount of tolerance.

Figure 4A:
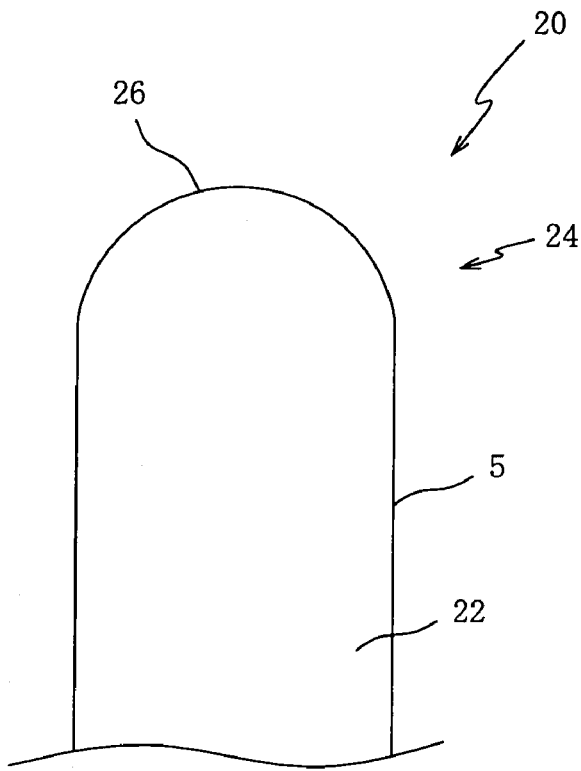
FIG. 4A is a front view of a non-rotary cutting tool which is constructed according to a second embodiment of the invention.

Referring next to FIG. 4A, there will be described a non-rotary cutting tool 20 which is constructed according to a second embodiment of the invention. The same reference numerals as used in the cutting tool 1 of the first embodiment will be used to identify the elements which are the same as those in the cutting tool 1. No redundant description of these elements will be provided.

FIG. 4A is a front view showing in enlargement its semi-cylindrical body portion 22 of the non-rotary cutting tool 20. This cutting tool 20 is identical with the cutting tool 1 of the first embodiment of the invention, except for its cutting edge 24, more specifically, the shape of its end cutting edge portion 26. That is, while the end cutting edge portion 6 of the cutting tool 1 is provided by a straight linear edge, the end cutting edge portion 26 of this cutting tool 20 is provided by a substantially arcuate-shaped edge which is convexed in a direction away from the cylindrical shank portion 3 (not shown), i.e., in the upward direction as seen in FIG. 4A. The end cutting edge portion 26 as well as the side cutting edge portion 5 is covered by a diamond coating which is ground to have a smoothed surface, as in the cutting tool 1.

This non-rotary cutting tool 20 provides substantially the same technical advantage as the non-rotary cutting tool 1 of the first embodiment, and is capable of forming, in a workpiece, a slot or groove having a smoothly curved bottom surface. In a process of manufacturing the cutting tool 20, the body portion 22 may be formed to have a predetermined contour corresponding to a cross sectional shape of the slot or groove that is to be formed with the cutting tool 20. After the formation of the body portion 22 with the predetermined contour, the cutting edge 24 is coated with the diamond coating, and the diamond coating is then ground. Thus, the body portion 22 is easily given the predetermined contour.

Figure 4B:
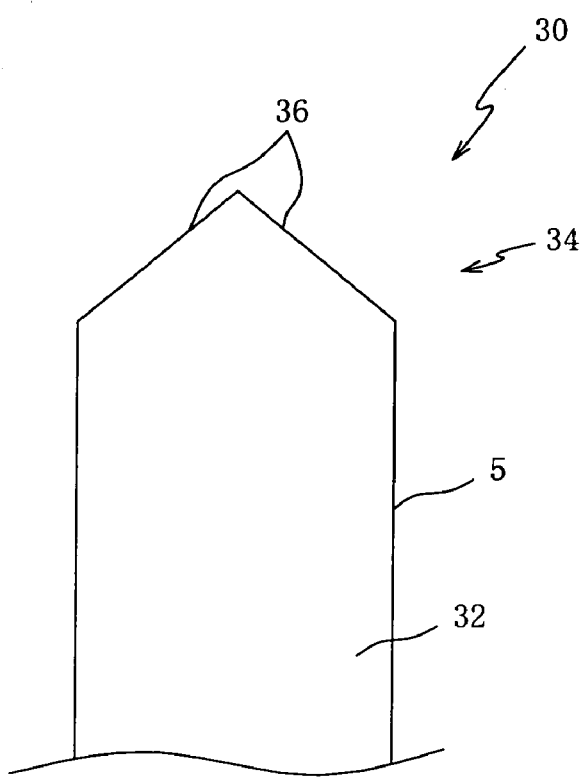
FIG. 4B is a front view of a non-rotary cutting tool which is constructed according to a third embodiment of the invention.

Referring next to FIG. 4B, there will be described a non-rotary cutting tool 30 which is constructed according to a third embodiment of the invention. The same reference numerals as used in the cutting tool 1 of the first embodiment will be used to identify the elements which are the same as those in the cutting tool 1.

FIG. 4B is a front view showing in enlargement its semi-cylindrical body portion 32 of the non-rotary cutting tool 30. This cutting tool 30 is identical with the cutting tool 1 of the first embodiment of the invention, except for its cutting edge 34, more specifically, the shape of its end cutting edge portion 36. That is, while the end cutting edge portion 6 of the cutting tool 1 is provided by a straight linear edge perpendicular to the axis of the cylindrical shank portion 3, the end cutting edge portion 36 of this cutting tool 30 is provided by a substantially V-shaped edge which is convexed in a direction away from the cylindrical shank portion 3 (not shown), i.e., in the upward direction as seen in FIG. 4B. The end cutting edge portion 36 as well as the side cutting edge portion 5 is covered by a diamond coating which is ground to have a smoothed surface, as in the cutting tool 1.

This non-rotary cutting tool 30 provides substantially the same technical advantage as the non-rotary cutting tool 1 of the first embodiment, and is capable of forming, in a workpiece, a slot or groove having a substantially V-shaped cross section. In a process of manufacturing the cutting tool 30, the body portion 32 may be formed to have a predetermined contour corresponding to a cross sectional shape of the slot or groove that is to be formed with the cutting tool 30. After the formation of the body portion 32 with the predetermined contour, the cutting edge 34 is coated with the diamond coating, and the diamond coating is then ground. Thus, the body portion 22 is easily given the predetermined contour.

While some embodiments of the present invention have been described above in detail for illustrative purpose only, it is to be understood that the invention is not limited to the above-described embodiments but may be otherwise embodied.

For example, the side cutting edge portion 5 of the cutting edge 4 may be provided at each of the widthwise opposite ends of the rake face 8, or alternately, may be provided at a selected one of the widthwise opposite ends of the rake face 8.

Although there has not been described that in the above description, it is possible to recycle or reutilize the above-described cutting tools 1, 20, 30. That is, when the diamond coating covering the cutting edge or the cutting edge per se is damaged or worn as a result of long-time service of the cutting tool, the substrate of the cutting tool can be recycled or reutilized, instead of preparing a new substrate. For example, the cutting tool having the worn coating may be burnt in a furnace, so that the worn coating is burned out or removed from the substrate. The substrate is recoated with the diamond coating, and the substrate recoated with the diamond coating is then ground so as to have a resharpened cutting edge. Thus, the recycle or reutilization of the cutting tools can be easily made, leading to a reduced manufacturing cost.

It is to be understood that the present invention may be embodied with various other changes, modifications and improvements, which may occur to those skilled in the art, without departing from the spirit and scope of the invention defined in the following claims:

What is claimed is:

1. A non-rotary cutting tool which is to be moved relative to a workpiece in a predetermined direction for cutting the workpiece, comprising:

a generally cylindrical shank portion; and a generally semi-cylindrical body portion which is coaxial with said cylindrical shank portion and which is constituted by a rake face and an outer circumferential surface, said rake face having a width smaller than a diameter of said cylindrical shank portion;

wherein said semi-cylindrical body portion has a cutting edge which is configured by a side cutting edge portion and an end cutting edge portion which are provided by an edge of said rake face and are covered with a diamond coating; and wherein said semi-cylindrical body portion has a half-moon shape in cross section where a curved line portion of said half-moon shape is configured by the outer circumferential surface and a single straight line portion of said half-moon shape is configured by the rake face, and a rake angle of said side cutting edge portion and a rake angle of said end cutting edge portion are respectively 0° when cutting the workpiece where the rake angle is an angle between the rake face and a tool reference plane where the tool reference plane is a plane perpendicular to said predetermined relative moving direction; and wherein said side cutting edge portion and said end cutting edge portion intersect perpendicularly with each other, and wherein said cutting tool cuts the workpiece while being kept unrotated.

2. A non-rotary cutting tool according to claim 1, wherein said side cutting edge portion and said end cutting edge portion of said cutting edge are contiguous to each other; and wherein said side cutting edge portion is defined by an intersection of said rake face and said outer circumferential surface, while said end cutting edge portion is defined by an intersection of said rake face and an axially distal end face of said semi-cylindrical body portion.

3. A non-rotary cutting tool according to claim 2, wherein said side cutting edge portion and said end cutting edge portion of said cutting edge intersect with each other at a corner where said corner has a nose radius of curvature of not larger than 0.05 mm.

4. A non-rotary cutting tool according to claim 1, wherein said diamond coating has a surface smoothed to have a surface roughness Rz of not larger than 1.60 µm.

5. A non-rotary cutting tool according to claim 2, wherein at least one of said side cutting edge portion and said end cutting edge portion of said cutting edge is sharpened to a degree that a radius on each of said at least one of said side cutting edge portion and said end cutting edge portion is not larger than 0.03 mm.

6. A non-rotary cutting tool according to claim 2, wherein said side cutting edge portion of said cutting edge has a high degree of parallelism with respect to an axis of said cylindrical shank portion such that an error in said parallelism is not larger than 3 µm;

and wherein said end cutting edge portion of said cutting edge has a high degree of perpendicularity with respect to said axis of said cylindrical shank portion such that an error in said perpendicularity is not larger than 3µm; and thereby cutting the workpiece by the side and end cutting edge portions with a high degree of precision when the cutting tool is moved relative to the workpiece in the predetermined direction.

7. A non-rotary cutting tool according to claim 1, wherein said rake face is provided by a flat surface which is elongated in an axial direction of said semi-cylindrical body portion.

8. A non-rotary cutting tool according to claim 1, wherein said rake face is a planar surface thereby forming said single straight line portion of said half-moon shape, said rake face extending between two side ends of the outer circumferential surface of the generally semi-cylindrical body portion.

* * * * *